United States Patent [19]
Mori et al.

[11] Patent Number: 4,803,683
[45] Date of Patent: Feb. 7, 1989

[54] METHOD AND APPARATUS FOR TESTING A DISTRIBUTED COMPUTER SYSTEM

[75] Inventors: Kinji Mori, Yokohama; Yasuo Suzuki, Ebina; Katsumi Kawano, Fuchu; Masayuki Orimo, Machida; Minoru Koizumi, Yokohama; Hirokazu Kasajima, Hitachi; Kozou Nakai, Katsuta, all of Japan

[73] Assignee: Hitachi, Ltd., Tokyo, Japan

[21] Appl. No.: 895,375

[22] Filed: Aug. 11, 1986

[30] Foreign Application Priority Data

Aug. 30, 1985 [JP] Japan .................................. 60-191782
Dec. 11, 1985 [JP] Japan .................................. 60-281418

[51] Int. Cl.$^4$ ............................................. G06F 11/00
[52] U.S. Cl. ........................................ 371/19; 364/300
[58] Field of Search ................. 371/15, 16, 19, 20, 371/27, 25, 18, 29; 364/200, 900, 300

[56] References Cited

U.S. PATENT DOCUMENTS

| | | | |
|---|---|---|---|
| 4,453,210 | 6/1984 | Suzuki | 371/16 |
| 4,589,068 | 5/1986 | Heinen | 371/19 |
| 4,627,054 | 12/1986 | Cooper | 371/16 |

*Primary Examiner*—Michael R. Fleming
*Attorney, Agent, or Firm*—Antonelli, Terry & Wands

[57] ABSTRACT

In a distributed processing system where a series of processes are carried out by distributed processors connected through a network without provision of a control processor which controls the overall system, an arbitrary processor generates test information and the processors, each having a memory for storing a program to be tested, decide whether or not the program is to be test-run in accordance with the test information and, if test-run is carried out, send out the result of the test-run program into the network when necessary.

17 Claims, 27 Drawing Sheets

F I G. 1
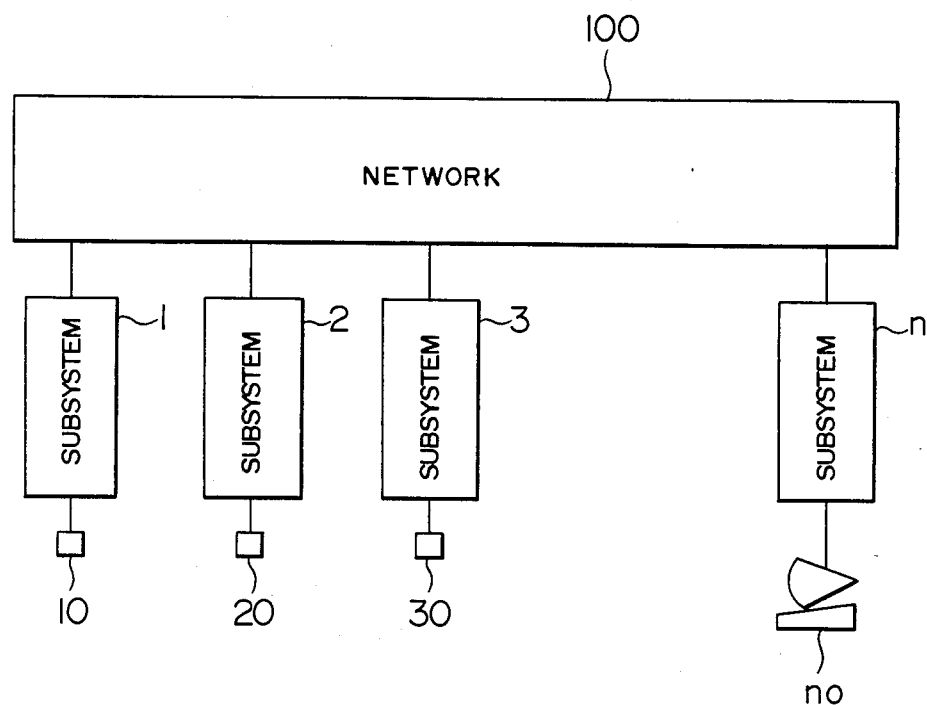

F I G. 5

TEST SPECIFICATION TABLE (31)

| TEST DATA SEQUENCE (OUTPUT/INPUT) | RECEPTION TEST DATA SEQUENCE (OUTPUT/INPUT) | DATA TRANSMISSION SUBSYSTEM |
|---|---|---|
| $D'_1$ | $D'_1(t)$ | SENDING ADDRESS n |
| $d'_2 / D'_1$ | $D'_2(t) / D'_1(t)$ | SENDING ADDRESS 1 |
| $d'_3 / D'_1$ | $D'_3(t) / D'_1(t)$ | SENDING ADDRESS 2 |
| $d'_4 / d'_3$ | | |
| $d'_5 / d'_3$ | | |
| ⋮ | ⋮ | ⋮ |

F I G. 10
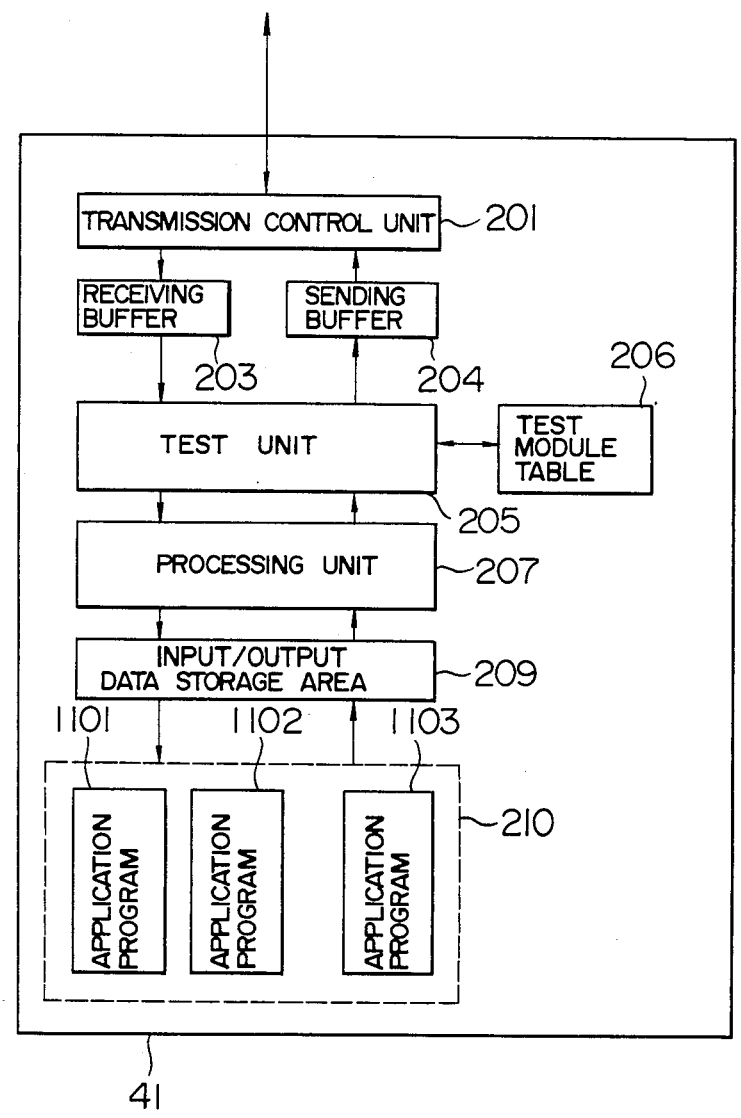

TO PROCESSING MODULE

TO PROCESSING MODULE

TO PROCESSING MODULE

F I G. 20(a)
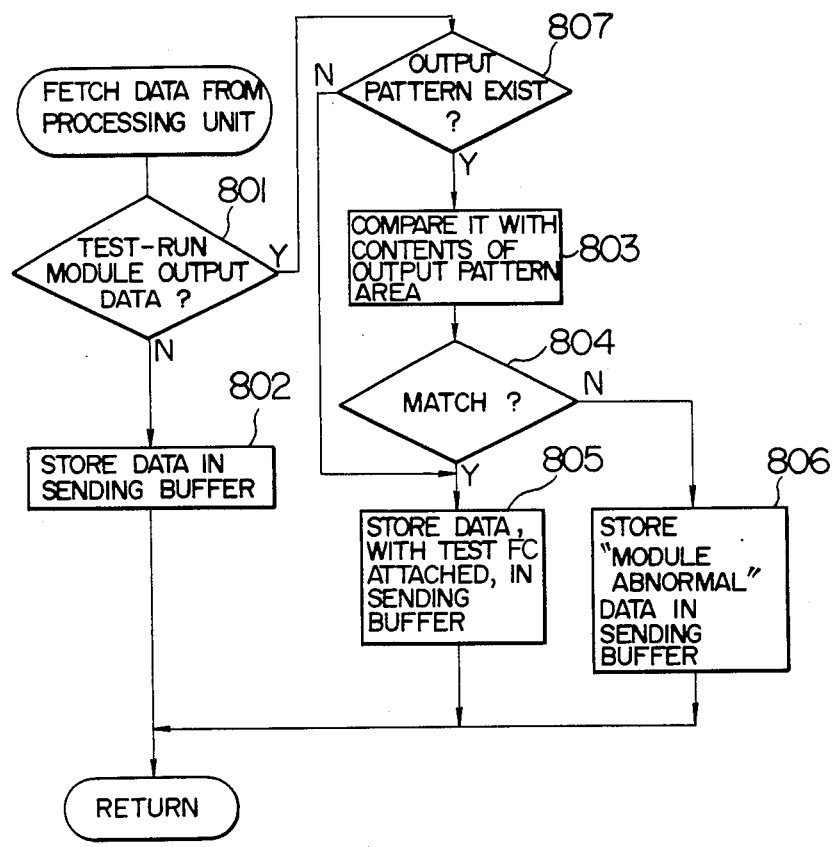

F I G. 20(b)
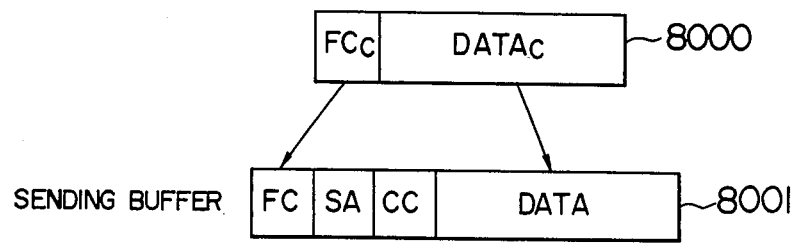
F I G. 20(c)
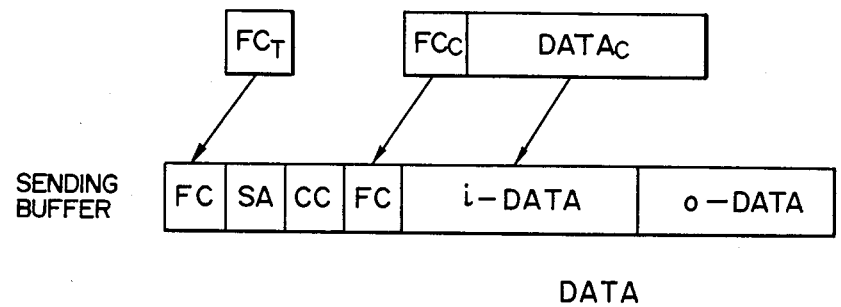
DATA

F I G. 24(a)
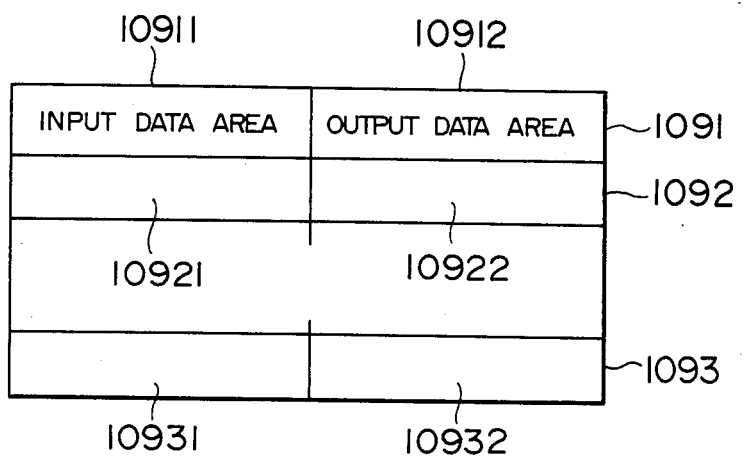
F I G. 24(b)
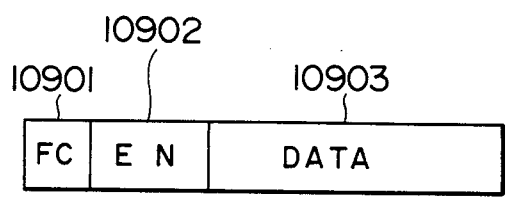

F I G. 27(a)
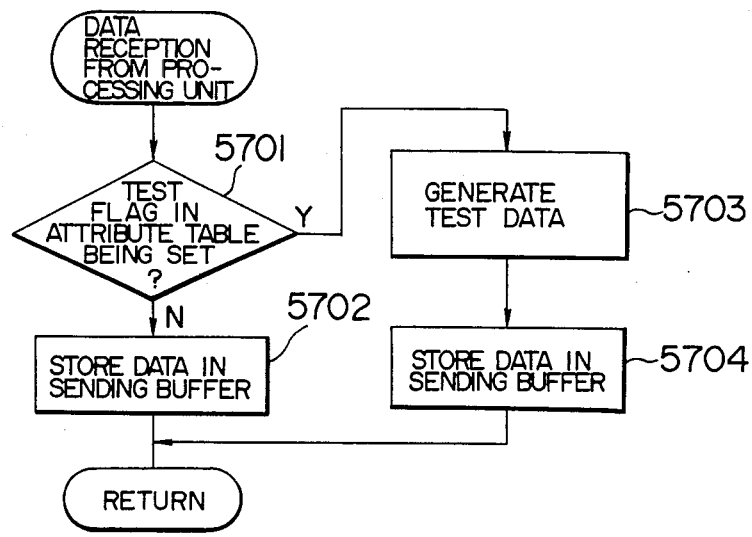
F I G. 27(b)
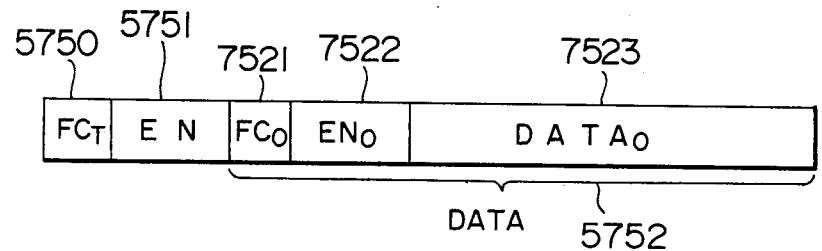

F I G. 29(a)
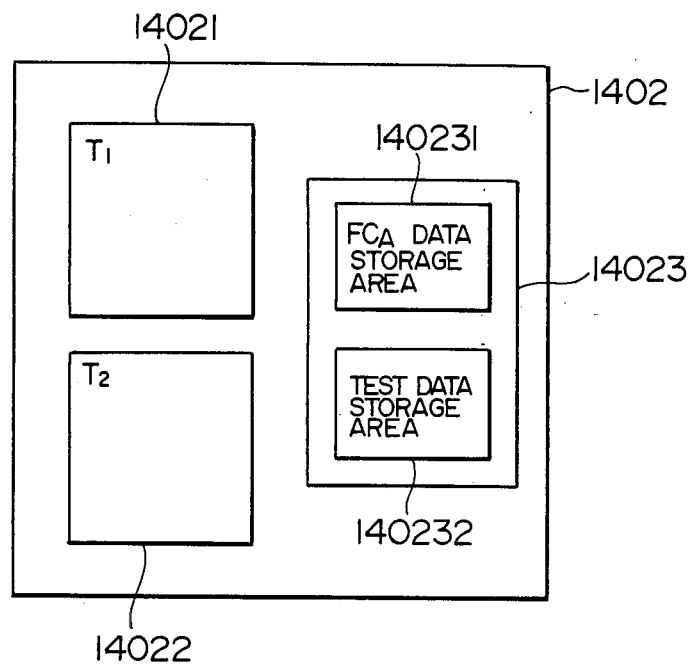

METHOD AND APPARATUS FOR TESTING A DISTRIBUTED COMPUTER SYSTEM

BACKGROUND OF THE INVENTION

1. Field of the Invention

This invention relates to a method and apparatus for testing a computer system and, particularly, to a method and apparatus for testing a distributed computer system without suspending the system operation.

2. Description of the Prior Art

Recently, computer systems are more distributed, allowing the distribution of functions and prevention of load concentration, with the result of reduction in expenses of processing and communication. Distributed systems are advantageous in their enhanced reliability and expandability, but also impose a subject of how to service a system which is spatially distributed. Particularly, it is necessary for the maintenance staff to test whether or not each of the subsystems which constitute the total system is operating normally.

Conventional distributed systems have been incapable of testing the application program of each processor during the system operation. In this case, tests have been conducted by disconnecting a hardware or software resource to be tested from the active system or connecting additional test-oriented processor, memory and I/O unit to the system. In any case, it has not been possible to test a system in the same hardware configuration and same operating condition as that of the usual system operation. The latter case necessitates additional hardware devices. However, there is an intense demand for testing a system without suspending the operation.

In a distributed processing system in which a series of processings for one task are implemented distributively among processors connected on a common transmission line, there is proposed a system control method in which each distributed processor stores the program for carrying out the assigned part of the processings, fetches data used in the program execution over the transmission line, and commences the program execution upon readiness of the whole data, as disclosed for example in Japanese Patent Unexamined Publication No. 57-146361, entitled "DATA FLOW TYPE DISTRIBUTED PROCESSING SYSTEM". This method does not necessitate a control processor for controlling the overall system and enables a series of processings to be carried out distributively. However, it does not provide a method for test-running a program stored in each distributed processor during he on-line operation, therefore the method is insufficient for the system diagnostic and maintenance activities.

Some conventional computer systems incorporate means for collecting data produced as a result of program execution, however, it merely logs data on a time-series basis and is not satisfactory enough to analyze the test-run result using the collected resultant data.

SUMMARY OF THE INVENTION

The present invention is intended to overcome the foregoing deficiencies of the conventional distributed processing systems, and its prime object is to provide a distributed processing system which does not necessitate a control processor for controlling the overall system in carrying out a series of processings among the distributed processors, wherein a newly developed program to be loaded in each processor is test-run using data, thereby allowing the program test in the system on-line environment.

In order to achieve the above objective, the inventive method for testing a distributed processing system including a plurality of processors connected through a network, and a memory for storing a program to be tested for each processor, includes a step of generating test information when at least one of the processors operates as a tester for the stored program; and a step, implemented by any of said processors, of receiving the test information from the self processor or other processor and deciding in accordance with the, test information as to whether or not the program is to be test-run.

BRIEF DESCRIPTION OF THE DRAWINGS

FIG. 1 is a general block diagram of the distributed processing system, showing the first embodiment of this invention;

FIG. 5 is a diagram showing the test specification table used in the process of FIG. 4;

FIG. 10 is a block diagram showing the arrangement of the processors shown in FIG. 8;

FIGS. 19a–19c and 20(a)–20(c) are diagrams showing the processings of the test unit in the processor of FIG. 17.

FIGS. 23 and 24a–24b are diagrams showing the internal arrangement of a processor shown in FIG. 21;

FIGS. 25, 26 and 27a–27b are flowcharts showing the processings carried out by the processor of FIG. 23;

FIGS. 28a–28b and 29a–29c are diagrams explaining the processing of test data collection; and FIG. 30 is a flowchart explaining the processing of automatic program test-run implemented by the test unit.

DESCRIPTION OF THE PREFERRED EMBODIMENTS

Embodiments of this invention will now be described in detail with reference to the drawings.

FIG. 1 shows the overall configuration of the distributed processing system which represents the first embodiment of this invention. Shown in the figure are subsystems (distributed processors) 1 through n constituting the system, I/O devices 10, 20, 30, . . . n0, among those n0 is a display unit, and a network 100 which can be a public communication network or a leased communication network. The subsystems 1 through n are connected through the network 100, and the I/O devices 10, 20, ..., n0 are connected to the respective subsystems 1, 2, ..., n. The subsystems 1, 2, 3 and so on are objects of test, and the display unit n0 connected to the subsystem n is used to display the test result.

In FIG. 1, processors to be tested are linked with each other, and each processor is capable of identifying and discriminating test data. If input data is identified to be test data, only processing modules pertinent to the test data are run, and the result of processing is displayed as a test result output on the display terminal and at the same time delivered to the transmission system. It is also possible to broadcast the test result over the transmission system with a message indicative of the test result output appended to the process result, instead of passing it on to the output terminal. A test can be initiated at any time point in the system operation, and the operation of any input/output device can be restricted if it must not be halted. This embodiment allows testing without recognition of the location of a subsystem to be tested and its situation.

As features of this invention, (a) on-line data and test data are allowed to coexist in the flow of data in the network, and (b) on-line operation programs and programs to be tested are allowed to coexist not only in the on-line system, but also in the respective processors during the on-line operation. This enables a program under development to be loaded in a processor and tested during the on-line operation. There are three cases of the inventive test method: (i) test information appended to data, (ii) test data included in program, and (iii) test information held by processor. The embodiments described in the following is of case (i).

Figure 2:
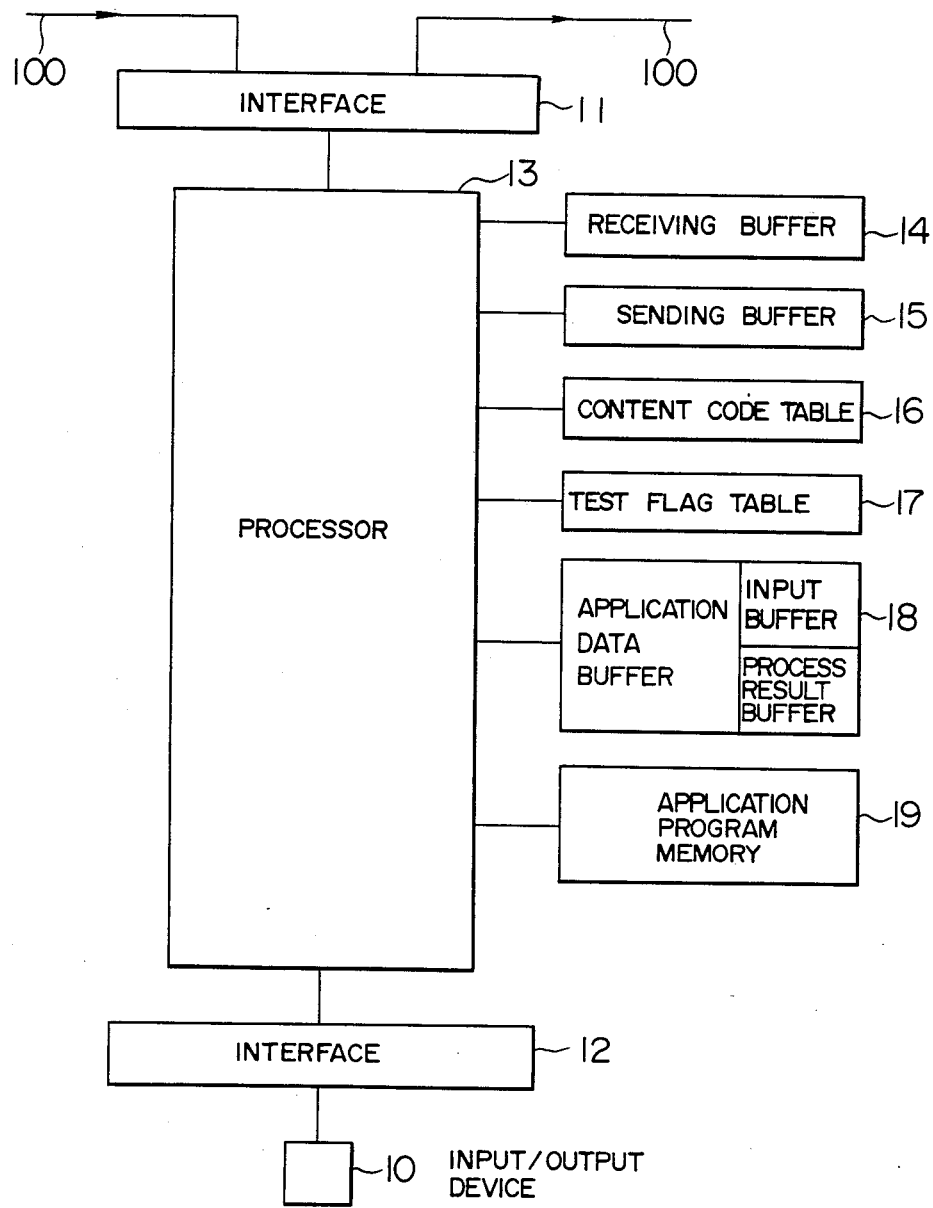
FIG. 2 is a block diagram showing the arrangement of the subsystems to be tested in the system of FIG. 1.

FIG. 2 shows the internal arrangement of the subsystem to be tested shown in FIG. 1. The arrangement includes an interface 11 for connection with the network 100, an interface 12 for connection with the input/output device 10, a processor 13 implementing the processing of the subsystem, a receiving buffer 14, a sending buffer 15, a content code table 16, a test flag table 17, an application data buffer 18 which is divided into an input buffer and a process result buffer, and an application program memory 19.

Each of the subsystems 1 through n has a specific function, which is performed by the application program stored in the application program memory 19. The subsystems run their application programs while exchanging data and making contact with one another through the network 100.

Figure 3:
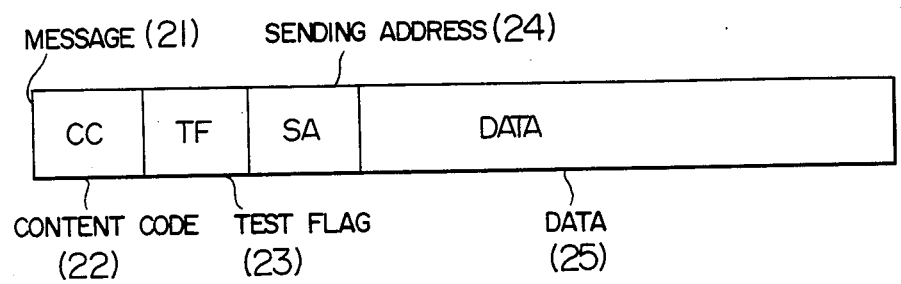
FIG. 3 is a diagram showing the format of messages issued by the subsystem of FIG. 2.

FIG. 3 shows the format of messages which carry data sent by subsystems. Data is formatted into a message as shown in FIG. 3, and sent out from subsystems. A message 21 includes a content code 22 indicative of the content of data, which is followed by a test flag 23 indicative of whether or not the data is for testing. The test flag 23 is followed by a sending address 24 and then by data 25. The message 21 is broadcast into the network 100.

Figure 4:
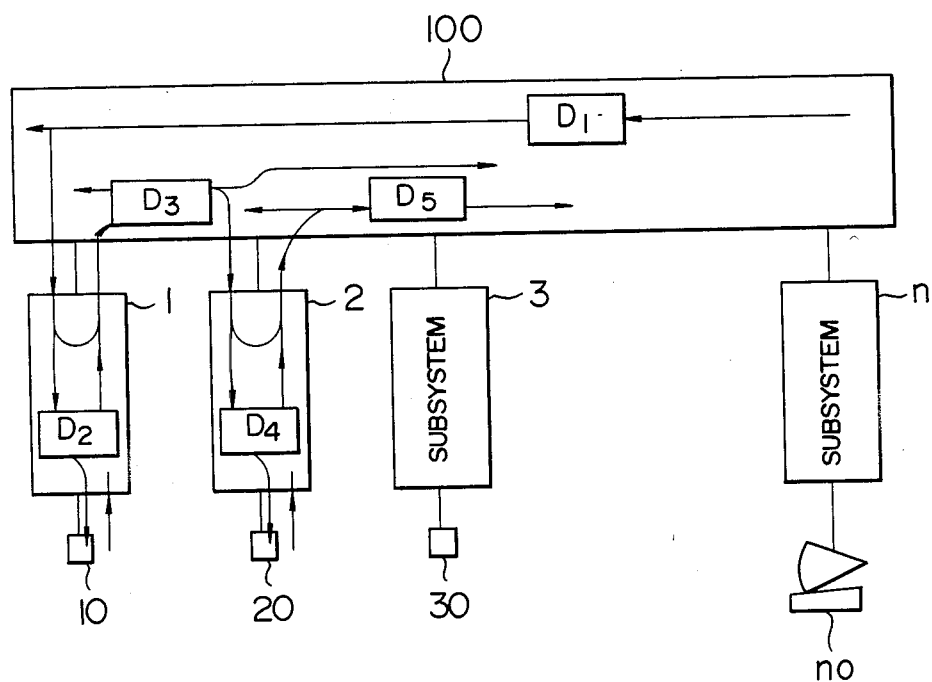
FIG. 4 is a diagram explaining the testing according to this invention.

FIG. 4 shows the sequence of processing for the message shown in FIG. 3. The message 21 is processed sequentially among the subsystems. As an example of operation, a message D1 is broadcast into the network 100. It is assumed that the application program of subsystem 1 is initiated in response to the content code 22 of the message D1. A further assumption is that the correspondence between content codes CC and application programs of subsystems to be run is registered in advance in the content code table 16 in each subsystem. If the content code 22 of the message 21 fetched from the network 100 into the receiving buffer 14 through the interface 11 matches the content code in the content code table 16, the processor 13 transfers the data 25 in the message 21 to the input buffer within the application data buffer 18. If the test flag 23 in the message 21 is found set, indicating the data to be used for testing, the test flag pertinent to the application within the test flag table 17 is set.

After the data has been stored in the input buffer within the application data buffer 18, the processor 13 initiates the application program. The processor 13 fetches data from the input/output device 10 when necessary, and stores the process result in the process result buffer within the application data buffer 18. If the test flag for the application program in the test flag table 17 is found reset, the processor 13 sends data D2 to the input/output device 10 depending on the process result in the process result buffer, and transfers a message D3 to the sending buffer 15 with the intention of sending the data D2 to other subsystems, and thereafter sends out the data D3 in the sending buffer 15 through the interface 11 into the network 100 at a proper timing of transmission.

The message D3 broadcast into the network 100 is processed in the same way as above by subsystem 2, for example. In FIG. 4, data D4 processed by the subsystem 2 is delivered to the input/output device 20 and at the same time data D5 is sent out from the sending buffer 15 into the network 100. In this manner, each subsystem continues processing while transacting data with the outside via its input/output device.

Figure 6:
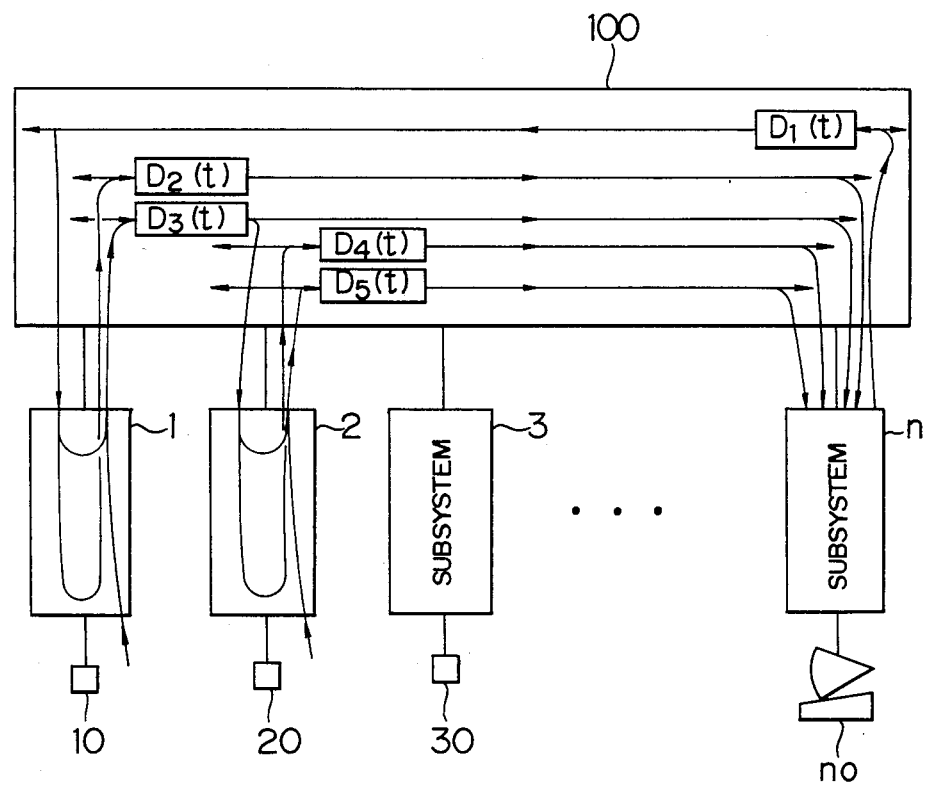
FIGS. 6 and 7 are diagrams showing the processings according, to this invention.

FIG. 6 shows the processing of test flag appended data. Data accompanied by the test flag is expressed as Di(t) (where i goes from 1 through n). The following describes the process when data Di(t) is sent out into the network 100. It is assumed that initially the subsystem n has created test data and sent it out in the form of message D1(t). In the manner shown in FIG. 4, the subsystem 1 collects the message D1(t), and its processor 13 stores the data in the application data buffer 18 and sets the flag of that application in the test flag table 17. The processor 13 fetches data from the input/output device 10 when necessary, and stores the process result in the process result buffer in the application data buffer 18. Detecting the set state of the test flag of the application program in the test flag table 17, the processor 13 sets the test flag 23 and sends the data in the process result buffer to be delivered to the input/output device 10 into the network 100 in the form of message D2(t), instead of passing it on to the input/output device 10. The message to be sent to other subsystems is also sent as message D3(t) into the network 100 via the sending buffer 15, with the test flag 23 being set. The message D3(t) broadcast into the network 100 is processed by the subsystem 2 in the same way as described above. On the other hand, the message D2(t) does not contain data to be processed in unison among the subsystems 1, 2, 3 and so on, and it is received by the subsystem n which monitors the test results. The subsystem n receives all test flag appended messages flowing in the network 100 and stores them. The monitoring subsystem n is provided in advance with a test specification table 31 in which the relation among input/output data for application software resources and the order of output of these data are defined.

FIG. 5 is a diagram for explaining the test specification table. The test specification table 31 is made up of a column 32 of test data sequence, a column 33 of reception test data sequence and a column 34 of data transmission subsystem. The test data sequence column 32 stores test data 25 and respective data content code 21 symbolized as di'. When the application program running for the input di' is to yield an output dj', the column 32 of test data sequence is written dj'/di'. For the input D1' for testing which is first broadcast into the network 100, applications of all subsystems are run sequentially and results are produced, and in this case their input/output relations are written sequentially from the top of the column 32 of test data sequence.

The monitoring subsystem n stores the content codes of the received test flag appended messages and data in the column 33 of reception test data sequence in the test specification table 31 and the sending addresses in the column 34 of data transmission subsystem. In this case, the test flag appended messages are stored in the order of reception and in locations relevant to the content codes in the column 32 of test data sequence.

If the contents of the test data sequence column 32 and reception test data sequence column 33 do not match, or if nothing matches the content code of the received test flag appended message, the subsystem which has issued that message is determined to be abnormal. The faulty subsystem can be identified from the sending address of that message.

Figure 7:
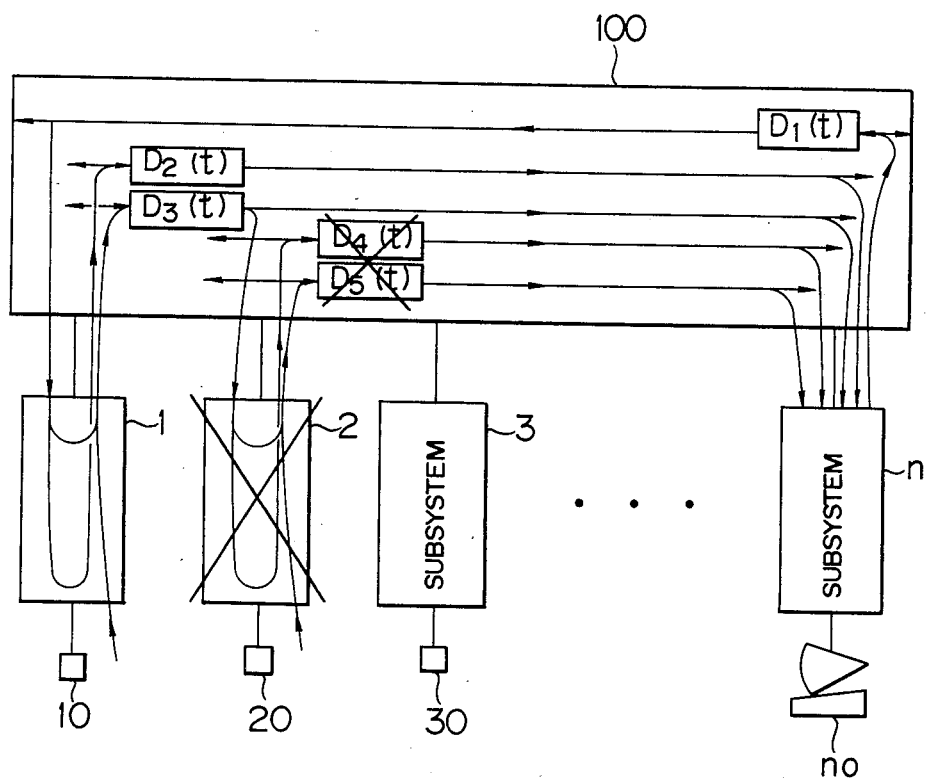

If the monitoring subsystem n does not receive the next test flag appended message on expiration of a certain time length following the transmission of the test data D1(t) or the reception of the test flag appended message, and at the same time if data exists in the test data sequence column 32 in the test specification table 31, the subsystem which ought to have sent that data is determined to be abnormal. For example, in FIG. 7, if the subsystem 2 breaks down, test flag appended messages D4(t) and D5(t) are not transmitted. The monitoring subsystem n recognizes, based on the test specification table 31, that the subsystem which ought to have sent the messages D4(t) and D5(t) is abnormal.

The above explanation is based on the assumption that each subsystem has a unique function, and each output message has a unique content code. Nevertheless, even if more than one test flag appended message having the same content code is outputted, abnormality detection takes place identically to the case described above. However, it should be noted that a plurality of data can be entered in the reception test data sequence column 33 of the test specification table 31. In such cases, the sending address in the data transmission subsystem column 34 will be more than one, accordingly.

Next, modified versions of the foregoing embodiment will be described.

Modification 1

The above embodiment allows the processor 13 to fetch data from the input/output device 10, when necessary, at the initiation of the application program. However, the use of the input/output device 10 for testing may not be allowed. In such a case, the subsystem n, for example, creates the same data as one to be received via the input/output device 10 in the form of the test flag appended message D3(t) and sends it over the network 100. Thereafter, the test process continues in the same way as the above embodiment.

Modification 2

In the previous embodiment, the process result of the application program is not delivered to the input/output device 10. However, the process result may be outputted to the outside provided that the test does not affect the system operation.

As described above, the first embodiment enables a system including several subsystems to be tested during the on-line operation without the need of mode switching for a subsystem under test or addition of special hardware, but in exactly the same system condition as in the normal operation. The embodiment also allows changes in the location of subsystem connection in the network. Moreover, any part of the system can be traced based on the test result for the detection of a faulty subsystem.

Figure 8:
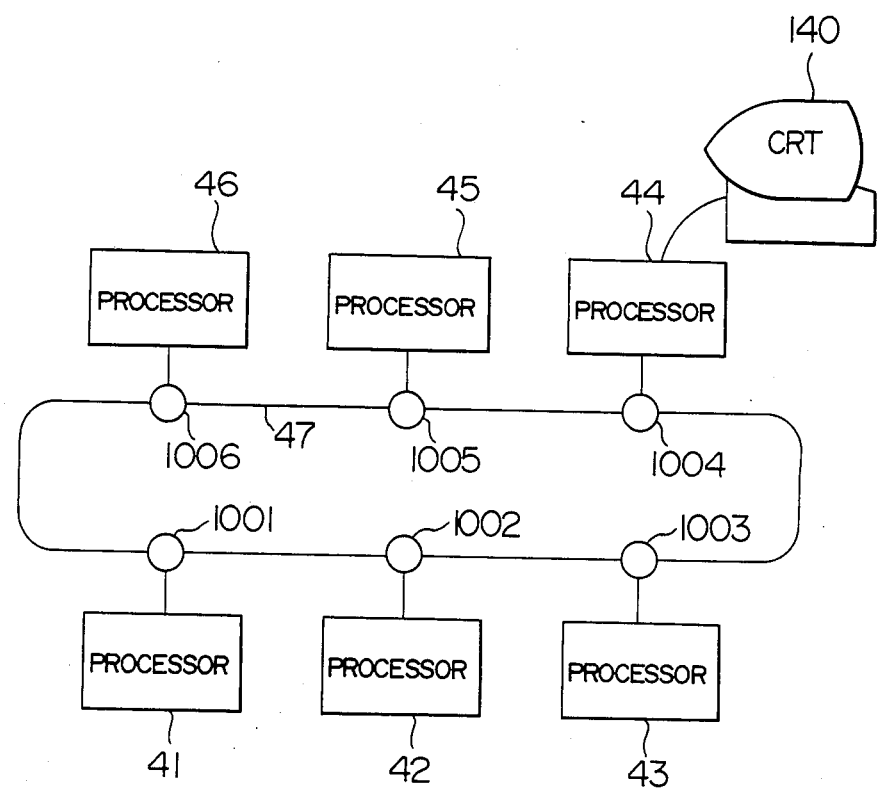
FIG. 8 is a block diagram of the distributed processing system, showing the second embodiment of this invention.

FIG. 8 shows the general arrangement of the distributed processing system to which the second embodiment of this invention is applied. The arrangement includes processors 41 through 46 each running an application program stored in its internal memory, a unidirectional loop transmission line 47 having a transmission direction shown by the arrow, and network control processors (NCPs) 1001 through 1006 for controlling data transmission on the line 47. The processors 41-46 are connected to the respective NCPs through bidirectional paths. The processors 41-46 have their process result data sent via the respective NCPs 1001-1006 onto the transmission line 47. Each NCP checks as to whether data on the transmission line 47 is useful for the associated processor and, if it is so determined, delivers the data to the processor. Each of the processors 41-46 collects all data necessary for the execution of the application program stored in it, and then proceeds to the program execution using the collected data.

This system has the functions of generating test data and collecting test result data using processor 44 as system tester, with the intention of carrying out the inventive test method. The processor 44 is connected with a CRT display terminal 140 used by the maintenance staff.

Figure 9:
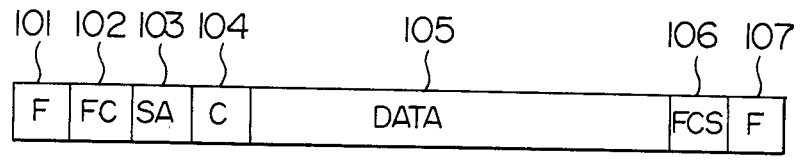
FIG. 9 is a diagram showing the format of messages used in the system of FIG. 8.

FIG. 9 shows the format of data flowing on the transmission line 47. The format includes flags (F) 101 and 107 indicating the beginning and end of a message, a function code (FC) 102 representing the data content and function, a source address (A) 103 indicating the NCP by which data is created, a serial number (C) 104 used for transmission, a data field 105 which information is processed by the application program, and a fault detection data (FCS) 106.

Each NCP picks up data having the same FC as one registered in the associated processor (FC of data used in its application program) and delivers the data to the processor.

FIG. 10 shows the internal arrangement of the processors, e.g., processor 41, in FIG. 8. A transmission control unit 201 implements data transfer between the NCP 1001 and processor 41, storing data received from the NCP into the receiving buffer 203 and delivering data in the sending buffer 204 to the NCP. A test unit 205 is to conduct the system test according to this invention, and a test module table 206 provides a memory area used by the test unit 205. A processing unit 207 controls the execution of application programs 1101-1103. An input/output data area 209 is used to store input and output data for each application program separately.

Figure 11:
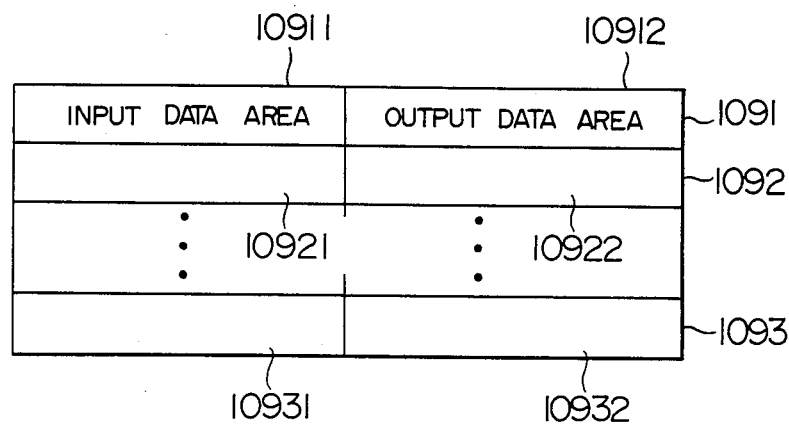
FIG. 11 is a diagram showing the format of test data used by the processor shown in FIG. 10.

FIG. 11 shows the structure of the input/output data area 209 in FIG. 10. The first row 1091 consists of an input data area 10911 which stores input data for the application program 1101 and an output data area 10912 which stores the process result yielded by the application program 1101. The second row 1092 has areas 10921 and 10922 for storing input and output data for the application program 1102. In this way, an input and output data areas are assigned to each application program. The processing unit 207 (FIG. 10) stores data received from the transmission line into the input data area of an application program which necessitates that data. If there is no application program which necessitates the received data, the processing unit 207 ignores the data. After all data used in the application program have been set in the input data area, the program is initiated. The application program, once it is initiated, goes on processing using data stored in its input data area within the input/output data area 209. Upon completion of execution, the program stores the process result data together with the data code FC in its output data area within the input/output data area 209. The data in the output data area is set in the sending buffer 204 via the processing unit 207 and test unit 205, and then transmitted by the transmission control unit 201 over the transmission line.

Figure 12:
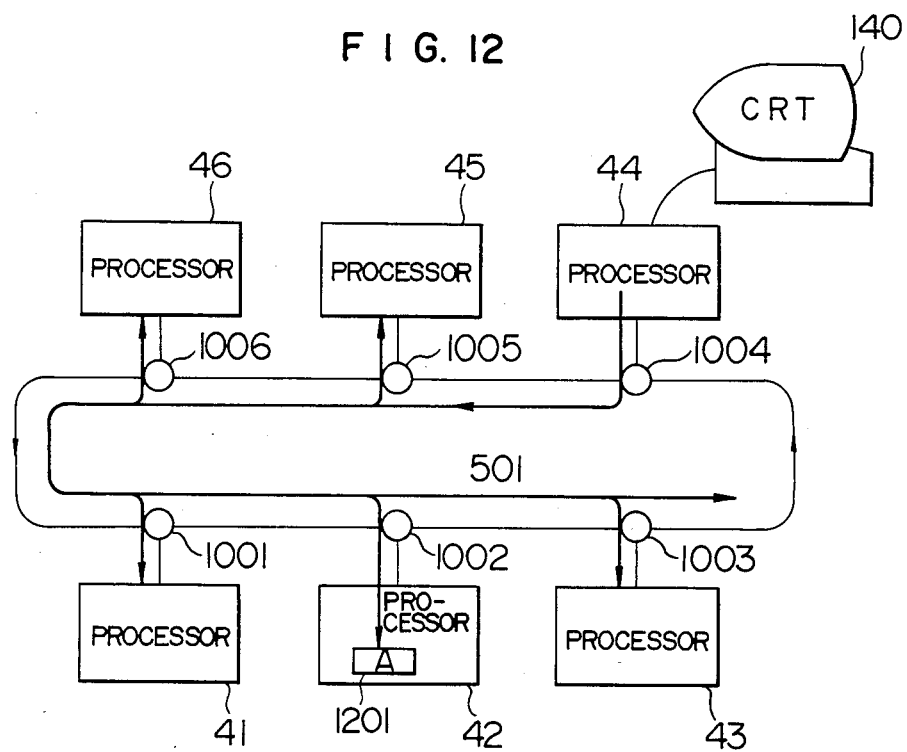
FIGS. 12 and 13 are diagrams used to explain the test-run operation.

FIG. 12 shows the test-run operation according to the second embodiment of this invention. The processor 44 which is set up as system tester for the distributed processing system has a test data generation program as an application program, and it produces test data using information entered through the CRT terminal 140 and sends the data over the transmission line as shown by the bold line 501. The following describes the test in the application program (A) 1201 of the processor 42 which is run using data with function code $FC_A$.

Figure 13:
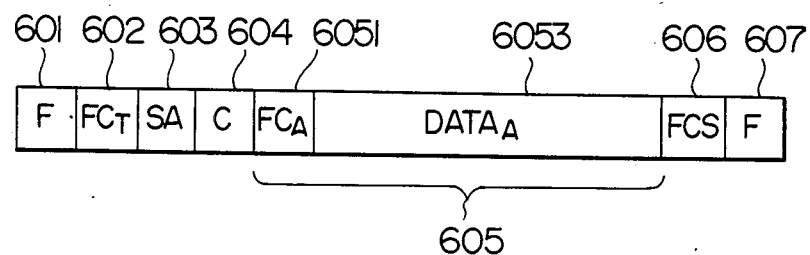

FIG. 13 shows the format of test data. This format is identical to that shown in FIG. 9, and $FC_T$ 602 which sets test data in the data section 105 of FIG. 9 is a function code (will be termed "test FC") indicating the data section to be a test data. The format includes fields 605 that are equivalent to the data field 105 in FIG. 9, and $FC_A$ 6051 and Data (A) 6053 that are the input data function code and data itself used in the test of the application program (A) 1201.

The NCPs connected to the processors 41-46 have the test FC ($FC_T$) registered in them, and each NCP fetches test data 501 and delivers it to the associated processor as shown in FIG. 12. The test data is stored in the receiving buffer 203 (FIG. 10) via the transmission control unit 201 (FIG. 10).

Figure 14A:
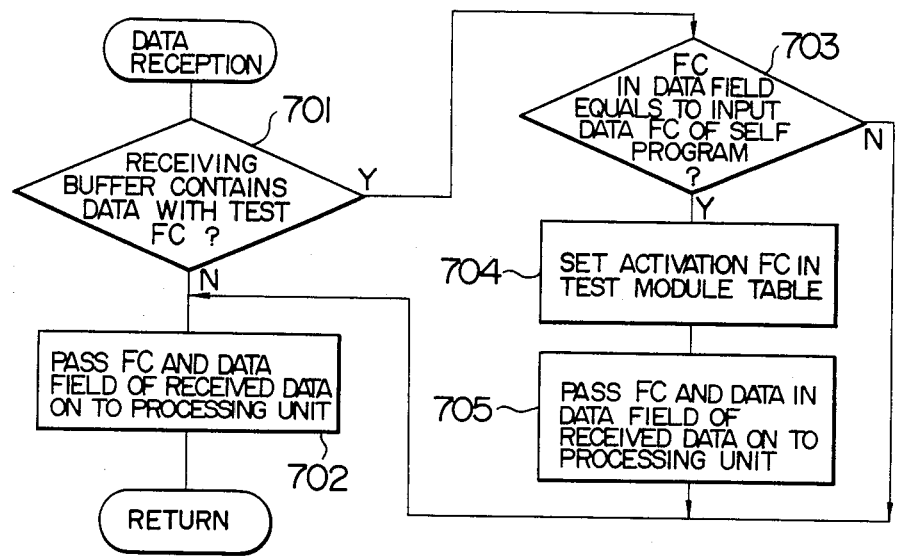
FIGS. 14a–14c and 15a–15(c) diagrams showing the processings of the test unit in the processor.
Figure 14B:
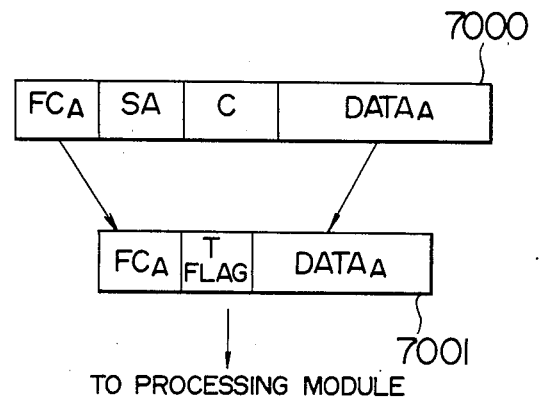
Figure 14C:
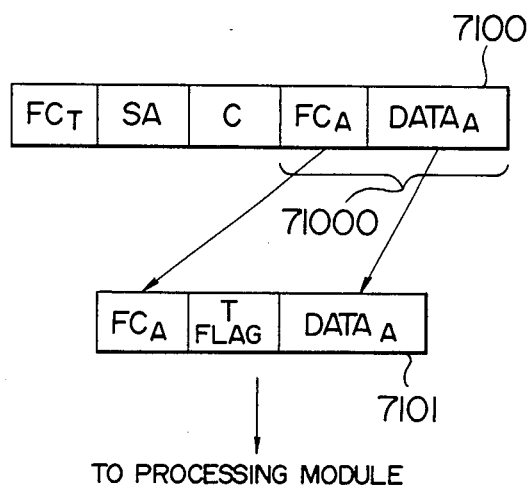
Figure 15A:
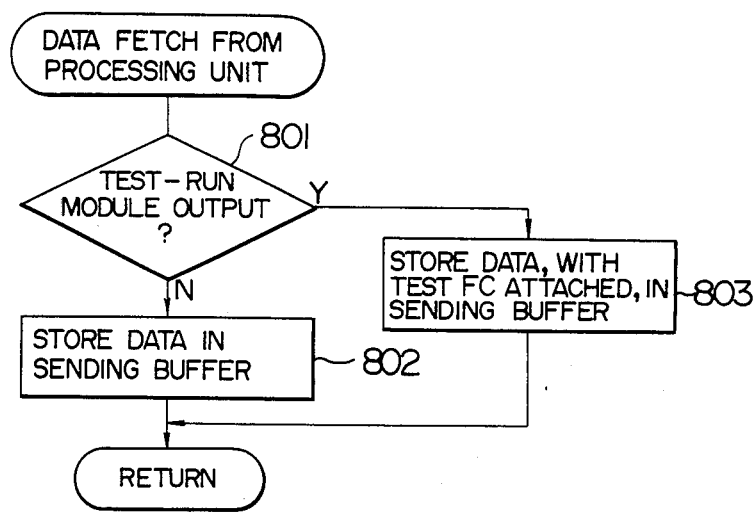
Figure 15B:
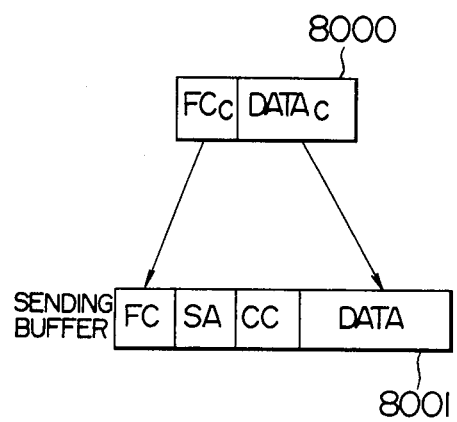
Figure 15C:
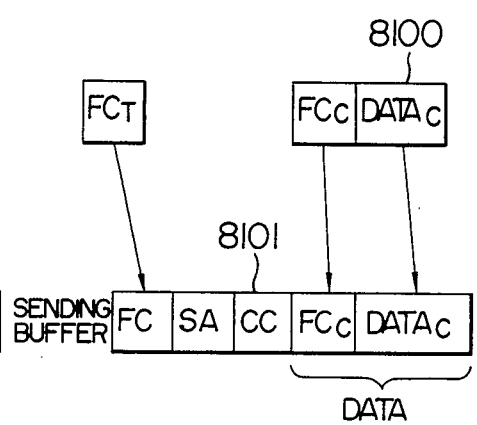

FIGS. 14 and 15 are diagrams explaining the operation of the test unit incorporated in each processor. The operation of the test unit 205 shown in FIG. 10 will be described using FIGS. 14 and 15. FIG. 14 shows the processing of the test unit 205 at data reception. The test unit 205 initially checks whether the function code stored in the FC field of data in the receiving buffer is the test FC, i.e., $FC_T$, (step 701). If it is not $FC_T$, the test unit 205 passes data 7001 consisting of a function code ($FC_A$), a data field (Data A) and a T-flag in reset state out of data 7000 in the receiving buffer on to the processing unit 207 (FIG. 10) as shown in FIG. 14(b) (step 702).

On the other hand, if the function code of the FC field of data in the receiving buffer is found to be $FC_T$, the test unit 205 checks whether the function code 6051 in the data section shown in FIG. 13 is the function code of data used in the self application program (step 703), and if the data is not useful for the self program, the test unit 205 terminates the process. If the function code in the data section is found to be the function code of data used by the self application program, the test unit 205 sets the flag in the test module table 206 (FIG. 10) indicative of the application program run by the input data for test running (step 704). Subsequently, the test unit 205 passes the data 7101 consisting of a function code ($FC_A$), test data field (Data A) and a T-flag in set state, all set in the data field 71000 of the received data 7100, on to the processing unit 207 (FIG. 10) as shown in FIG. 14(c) (step 705).

After all necessary data used for program execution have been fetched through the test unit 205, the processing unit 207 initiates the application program. Upon completion of processing, the application program stores the process result data (e.g., Data C) together with its function code (e.g., $FC_C$) in the input/output data area 209 (FIG. 10). The data is passed via the processing unit 207 (FIG. 10) on to the test unit.

Next, the processing of the test unit for output data yielded by the application program will be described using FIG. 15. Upon receiving application program output data from the processing unit, the test unit initially checks on the test module table 206 (FIG. 10) whether it is the output of the application program run by test data (step 801). If it is not the result of test running, the test unit 205 stores the function code $FC_C$ of the output data 8000 in the FC field of the sending buffer and the data (Data C) in the Data section of the sending buffer as shown in FIG. 15(b) (step 802). If it is found to be the output of test running, the test unit 205 stores the function code $FC_C$ of the output data 8100 and data (Data C) in the Data section of the sending buffer, and sets the test FC (i.e., $FC_T$) in the sending buffer FC field (step 803).

Figure 16A:
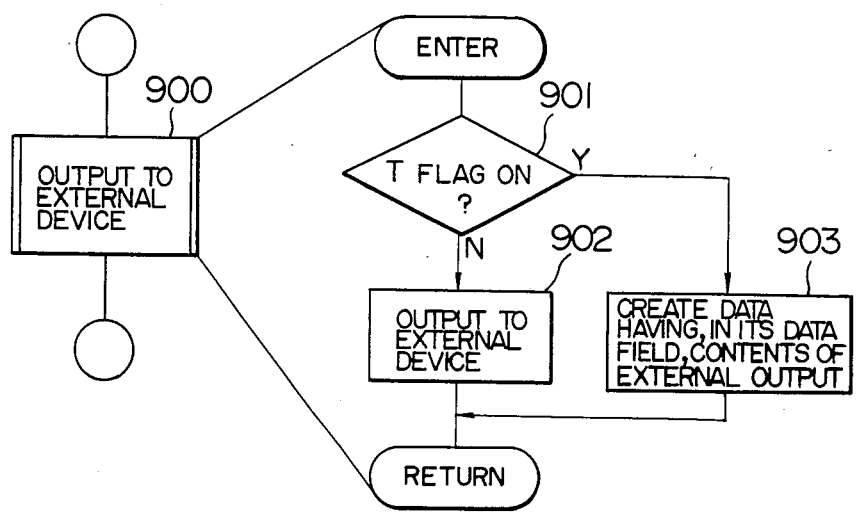
FIGS. 16a–16(b) are a set of diagrams showing the processings in the application program.
Figure 16B:

FIG. 16 shows the processing implemented in the application program. In the application program, the processing routine shown in FIG. 16(a) is executed when data is to be outputted to an external device. The external device output routine 900 checks the T-flag shown in FIGS. 14(b) and 14(c) (step 901), and if the T-flag is found reset, the data is outputted to the external device (step 902), or if the T-flag is found set, the data is not outputted to the external device, but data having the contents of the output data and invalid FC (FCf) in the data field and the test FC ($FC_T$) as a function code (see FIG. 16(b)) is created and stored in the input/output data area 209 (FIG. 10) (step 903).

An application program run by data having function code $FC_T$ and intended to collect such data is set up in the system tester, i.e., processor 44 in FIG. 8, so that program test data is collected.

On this account, even during the on-line operation of the system, an application program can be test-run by generating test data having the test FC by the tester processor. By operating on the tester processor to fetch data having the test FC, the test result or output data to the external device can be obtained.

Although in the above embodiment a processor, i.e., processor 44 in FIG. 8, is appointed fixedly to the tester for creating test data, the present invention is not intended to limit the tester to one processor, but any processor or any number of processors may be used for testing application programs and collecting the test results.

In the above embodiment, another application program which uses output data yielded by an application program run by test data is also test-run, and therefore a series of process results can be obtained for a process, in which several programs are executed successively, by merely generating test-run data for the first program. In the above second embodiment, each processor is provided therein with a test unit having the functions of discriminating test data and on-line data, generating program running data from the data to execute the program, forming the process result data into another test data and sending it over the common transmission line, so that when the data is identified to be test data, it is not outputted externally, but the output is sent out as test data over the common transmission line. This enables a system application program to be test-run by an arbitrary processor to obtain the test result even during the on-line operation of the distributed processing system, whereby the maintenance competence level of the system is enhanced.

Figure 17:
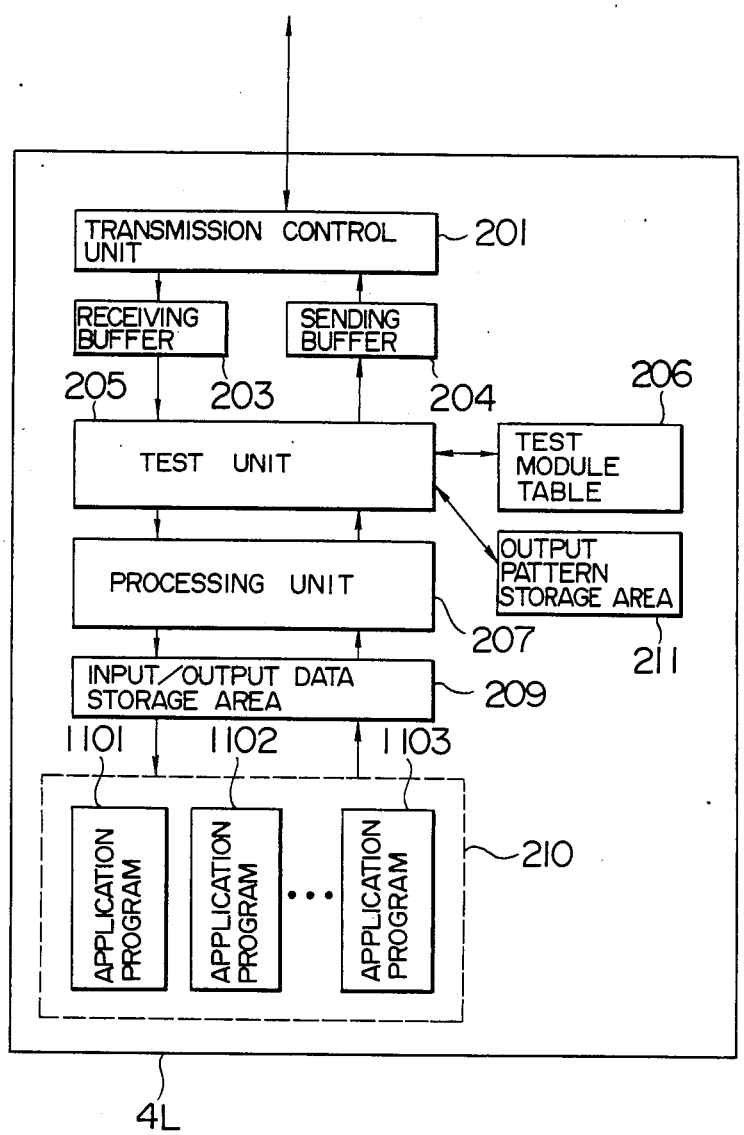
FIG. 17 is a block diagram of a processor in the distributed processing system, showing the third embodiment of this invention.

FIG. 17 shows the internal arrangement of the processors constituting the distributed processing system according to the third embodiment of this invention. In the distributed processing system shown in FIG. 8, the processors 41-46 are arranged in this embodiment as shown in FIG. 17. In contrast with the second embodiment shown in FIG. 10, the arrangement of FIG. 17 further includes an output pattern storage area 211 in addition to the arrangement of FIG. 10. The test unit 205 is used to test-run the application program, and it is provided with a test module table 206 and output pattern storage area 211. The remaining portion of the arrangement is identical to FIG. 10. The input/output data storage area 209 in FIG. 17 is divided into the input data area and output data area as shown in FIG. 11.

The test operation of the third embodiment will be described using FIG. 12 and FIG. 18. The processor 44 in FIG. 12, working as the system tester, is given a test data generation program as its application program, and it creates test data based on information entered through the CRT terminal 140 and sends it over the transmission line 501. The following describes the test of an application program A 1201 of the processor 42 which uses data having function code $FC_A$.

Figure 18:
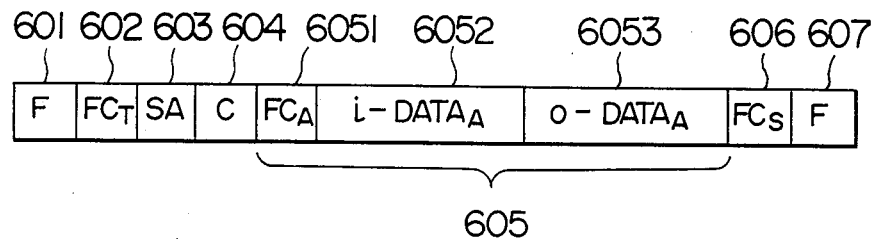
FIG. 18 is a diagram use to explain the test-run operation by the processor of FIG. 17.

FIG. 18 shows the format of test data. This format is identical to that shown in FIG. 9, and test data is set in the data field 105. The format includes a function code $FC_T$(test FC) 602 indicating test data, a field 605 equivalent to Data 105 in FIG. 9, and input data function code $FC_A$ 6051 and input data (i-Data A) 6052 for test-running the application program A 1201 (FIG. 12), and output data (will be termed "output pattern") produced as a result of execution of the program A using the data (i-Data) 6052.

The NCPs connected to the processors 41-46 have registered therein test FC ($FC_T$), and each NCP fetches test data 501 and delivers it to the associated processor as shown in FIG. 12. The test data is stored in the receiving buffer 203 via the transmission control unit 201 (FIG. 17).

Figure 19A:
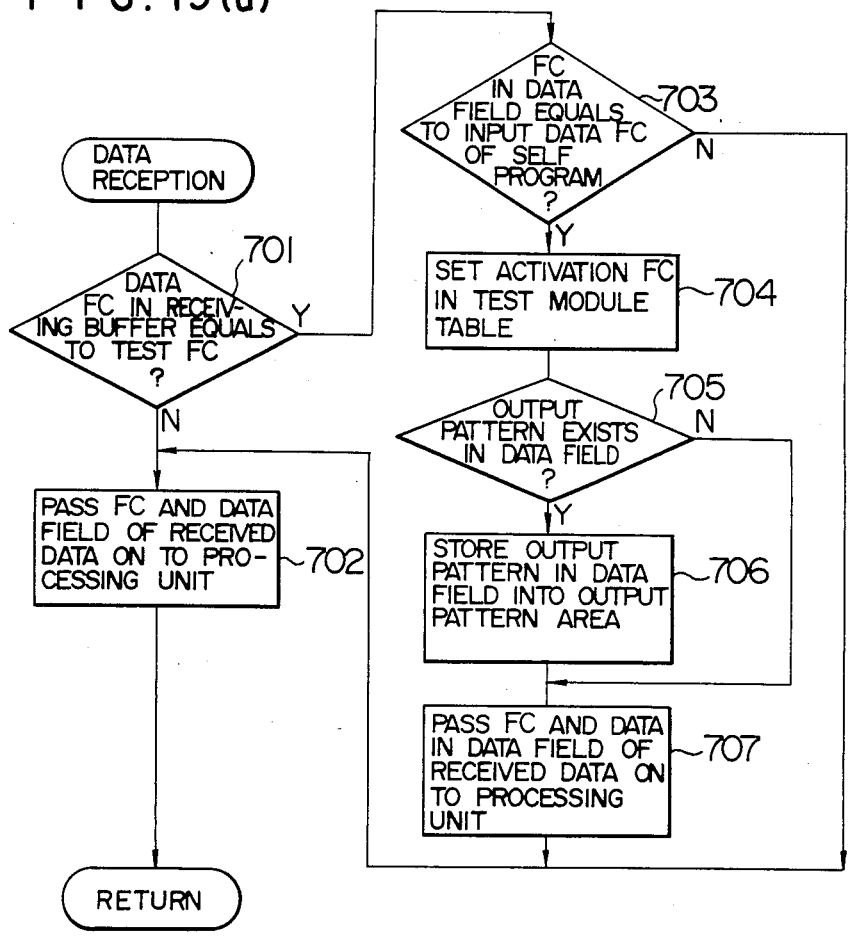
Figure 19B:
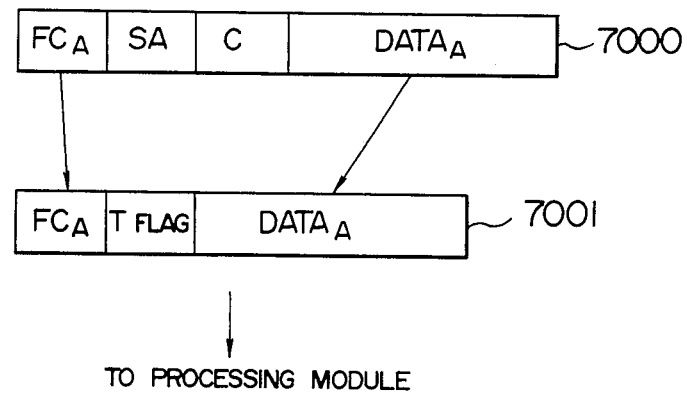
Figure 19C:
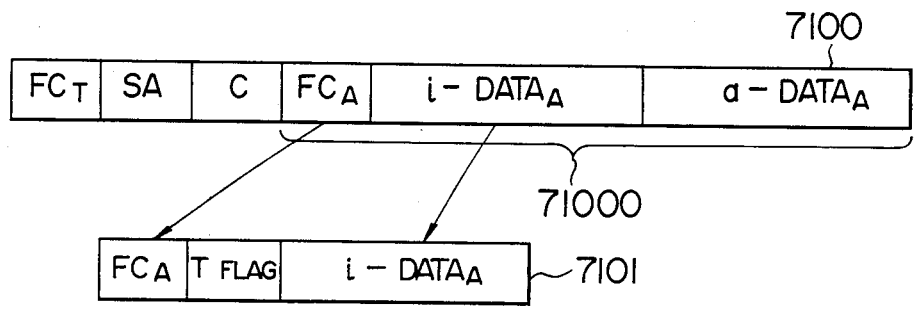

Next, the operation of the test unit 205 in FIG. 17 will be described using FIGS. 19 and 20. FIGS. 19(a), 19(b) and 19(c) show the data receiving operation of the test unit and the message transaction format. At data reception, the test unit 205 initially checks whether the function code stored in the FC field of data in the receiving buffer 203 is the test FC (i.e., $FC_T$) (step 701). If it is not the test FC, the test unit 205 passes data 7001 consisting of the function code $FC_A$, data field (Data A) and T-flag in reset state of data 7000 in the receiving buffer on to the processing unit 207 as shown in FIG. 19(b) (step 702). If the function code of the FC field of data in the receiving buffer is found to be the test FC, the test unit 205 checks whether the function code 6051 in the data field shown in FIG. 18 is the function code of data used by the self application program (step 703), and if it is not a useful data the test unit terminates the operation. If it is found to be the function code of data used in the self application program, the test unit sets the flag in the test module table 206 indicative of the application program run by the input data for testrun (step 704). Subsequently, the test unit 205 checks whether an output pattern is set in the data field of the receiving buffer (step 705), and if it is found set, the test unit 205 stores the output pattern O-Data A which is set in the data field 71000 of the received data 7100 into the output pattern storage area 211 as shown in FIG. 19(c) (step 706). Next, the test unit 205 passes data 7101 consisting of function code $FC_A$, test-run input data i-Data A and T-flag in the set state, all set in the data field 71000 of received data 7100, on to the processing unit 207 as shown in FIG. 19(c) (step 707). Upon receiving all of data necessary for the program execution from the test unit 205, the processing unit 207 initiates the application program.

After terminating the process, the application program stores the process result data (e.g., Data C) together with its function code (e.g., $FC_C$) in the input-/output data storage area 204. The data is passed via the processing unit on to the test unit 205.

The following describes the operation of the test unit in dealing with the application program output data with reference to FIG. 20. Upon receiving application program output data from the processing unit 207, the test unit 205 initially checks on the test module table 206 whether it is the output of the application program run by test data (step 801). If it is not the case of test-run, the test unit 205 stores the function code $FC_C$ of the output data 8000 in the FC field of the sending buffer and data Data C in the Data field of the sending buffer (step 802). If the output is found to be produced by test-run, the test unit 205 checks whether the output pattern of the program is stored in the output pattern storage area 211, and if it is found stored the test unit checks the matching with the output pattern (steps 803, 804). If matching does not result, the test unit 205 stores data indicative of abnormality of the test-run application program in the sending buffer (step 806). If matching results, the test unit stores the function code $FC_C$ and data Data C of the output data 8100 in the Data field of the sending buffer and sets the test FC ($FC_T$) in the FC field of the sending buffer as shown in FIG. 20(c) (step 803). In this case, the 0-Data area in the Data field of the sending buffer is cleared in advance.

The application program implements the processing shown in FIG. 16(a) when data is to be outputted to an external device. The program checks, by the external device output routine (step 900), the state of the T-flag shown in FIGS. 19(b) and 19(c), and if the T-flag is found reset, the data is outputted to the external device (step 902), or if the T-flag is found set, a data having the output content and invalid FC (FCf) in the data field and the test FC (FC$_T$) in the function code is created (see FIG. 16(b)) and it is stored in the input/output data storage area 209 (step 903). Test result data and application program run by the test data and intended to collect the data are set in the system tester 44 (FIG. 12), so that the program test-run result is collected.

The above third embodiment is also capable of detecting abnormality of an application program during the on-line operation of the system, by generating test data having the test FC using a tester processor and test-running the application program by receiving test result data. Although in the above embodiment the processor 44 in FIG. 12 is appointed fixedly to the tester for generating test data, the present invention does not intend to limit the tester to one fixed processor, but any processor or any number of processors may be used for the test of application programs.

In the above embodiment, application programs that use output data of an application program run by test data are also test-run. Therefore, it is possible to test a series of processings carried out by execution of several programs successively, through the setting of output patterns for the programs in the test-run data for the first program and through the provision in the test unit of a function for the comparison with an output pattern in test data pertinent to the output of the test-run program.

Although in the above embodiment information indicative of test-running and test-run data are transmitted by being set in the same data, a modified method is possible in which the information and data are set in separate data and only information indicative of test-running is transmitted in advance.

Although in the second and third embodiments the network is confined to a loop transmission system as an example, the present invention is also applicable to general networks.

Figure 21:
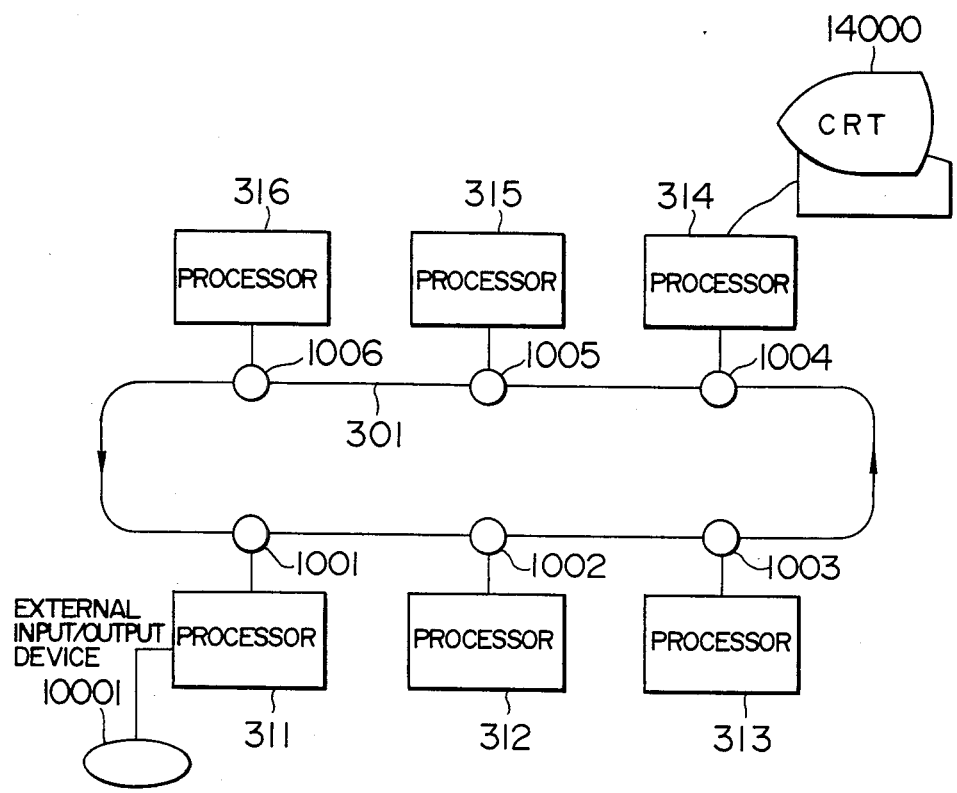
FIG. 21 is a block diagram of the distributed processing system, showing the fourth embodiment of this invention.

FIG. 21 shows the overall arrangement of the system to which the fourth embodiment of this invention is applied. The arrangement includes processors 311–316 which run application programs stored in the respective internal memories, a unidirectional loop transmission line 301 operative in the direction shown by the arrow, and network control processors (NCPs) 1001–1006 implementing data transmission control on the transmission line. The NCPs 1001–1006 are connected to the respective processors 311–316 through the bidirectional paths.

The processors 311–316 have their process results (data) sent out via the respective NCPs 1001–1006 onto the transmission line 301. Each of the NCPs 1001–1006 checks whether data flowing on the transmission line 301 is necessary for the associated processor, and, only if it is found useful, delivers it to the self processor.

After all data necessary for the execution of the stored application program have been prepared, each processor 311–316 initiates the program. The initiated program goes on processing using the fetched data.

In this system, the processor 314 is connected with a CRT console 14000 for use in the test according to this invention. Also in this system, the processor 311 is connected with an external input/output device 10001, through which external process data is entered.

Figure 22:
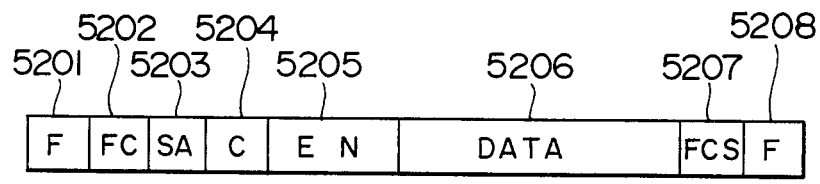
FIG. 22 is a diagram showing the format of messages transmitted in the system.

FIG. 22 shows the format of data flowing on the transmission line 301. The format includes a flag (F) 5201 which indicates the beginning of a message and a function code (FC) 5202 which represents the data content and function. Each NCP checks, based on the function code, whether received data is useful for the associated processor. The format further includes the address of the NCP which has transmitted the data (source address: SA) 5203, a serial number (C) 5204 used for the transmission, information (DATA) 5206 processed by the application program, an error detection data (FCS) 5207, a flag (F) 5208 indicating the end of message, and a serial number in the processing (EN) 5205 which consists of a processor number and a data generation serial number, the EN being called "event number" hereinafter.

Figure 23:
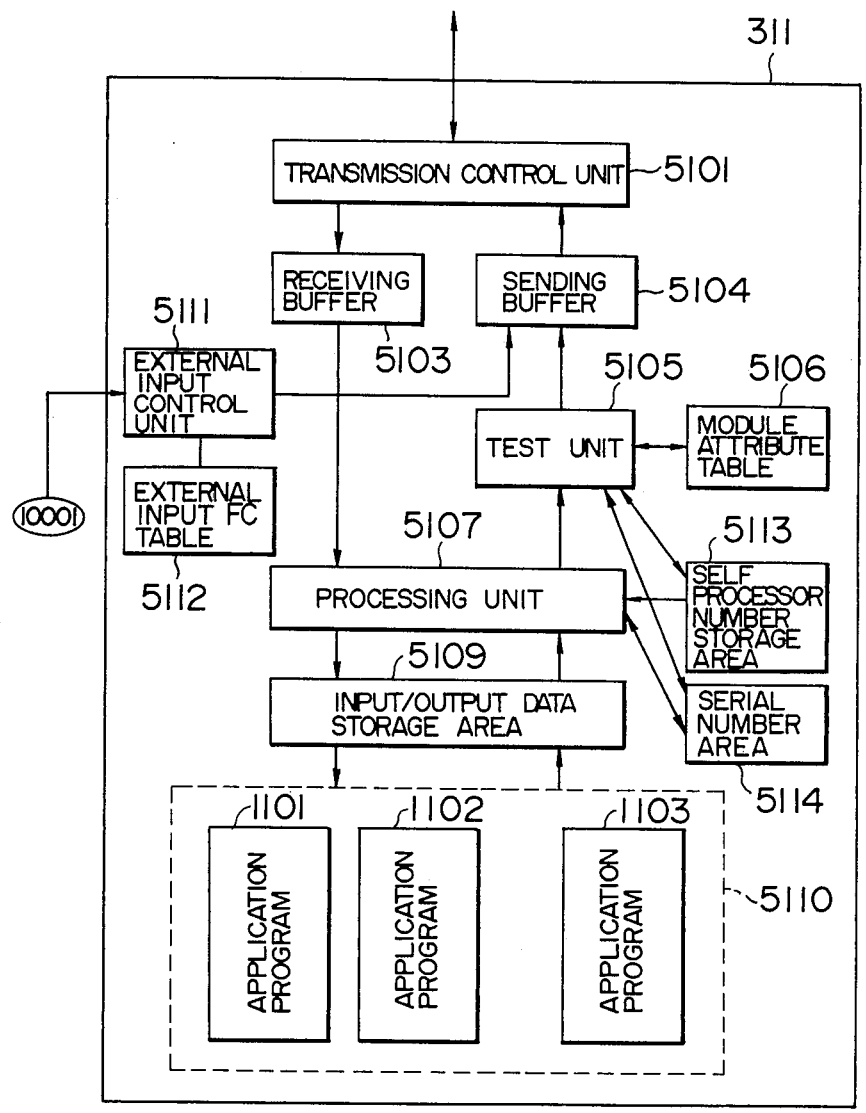

FIG. 23 shows the internal arrangement of the processors 311–316, e.g., processor 311, shown in FIG. 21. In the arrangement, the transmission control unit 5101 transfers data between the NCP 1001 and processor 311 in such a way of storing data which has been received from the NCP into the receiving buffer 5103 and sending data in the sending buffer 5104 to the NCP and at the same time, if the data is useful for the application program of the self processor, stores it in the receiving buffer 5103. The test unit 5105 is to implement the test according to this invention, and the module attribute table 5106 is to store information indicative of whether or not each application program is in the test-run mode. The processor number storage area 5113 is to store the processor number which is assigned uniquely to each processor, and the serial number area 5114 is used as a counter for counting the number of data generation.

The processing unit 5107 is to control the execution of application programs 1101–1103. The external input control unit 5111 is to input data from the external input/output device 10001. The external input FC table 5112 is an area for storing the function code of external input data. The input/output data storage area 5109 is to store input and output data of each application program separately.

FIG. 24(a) shows the structure of the input/output data storage area 5109. The first row 1091 is the input/output data area for the application program 1101, of which an area 10911 stores input data and an area 10912 stores the process result of the application program 1101. The second row 1092 is for input/output data of the application program 1102, and in the same manner, input/output data areas are provided for the remaining application programs.

FIG. 24(b) shows the format of data stored in the input data area and output data area. The format includes a function code (FC) 10901 of input or output data, an event number (EN) 10902 of input or output data, and input or output data itself (DATA) 10903.

The following describes an embodiment of the inventive test method.

Figure 25A:
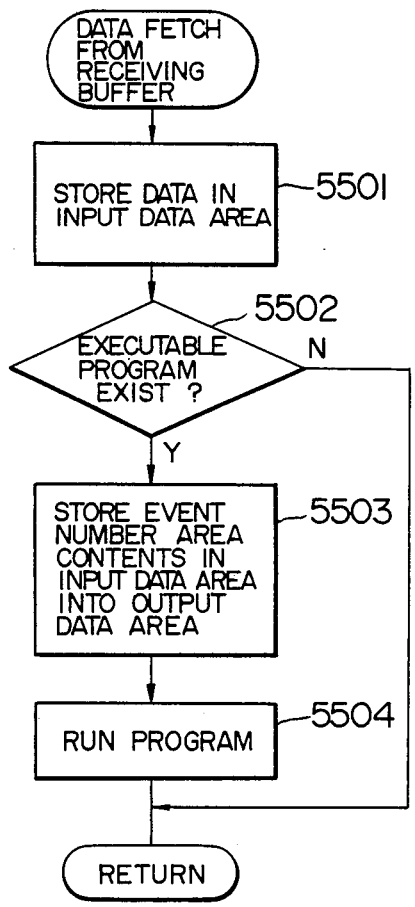
Figure 25B:
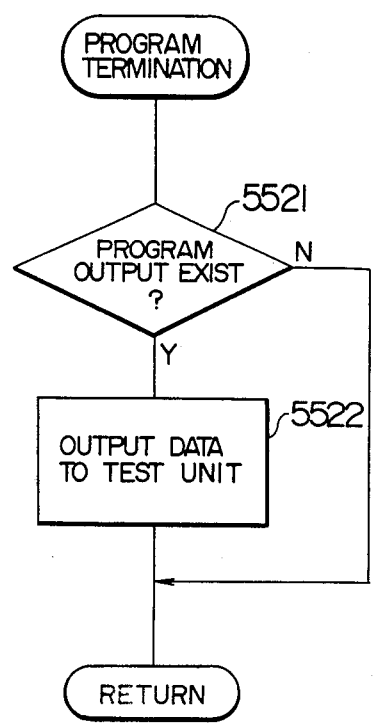

FIGS. 25(a) and 25(b) show in flowchart the operation of the processing unit 5107. The data receiving operation will first be described with reference to FIG. 25(a). The processing unit 5107 fetches data from the receiving buffer 5103, and stores the function code (FC), event number (EN) and data itself (DATA) of the message entered in the input data area within the input-/output data storage area (step 5501).

Subsequently, the processing unit 5107 checks whether or not an executable application program exists, namely whether all input data necessary for program execution has been stored in the input data area 10911 (step 5502). If an executable program exists, the processing unit 5107 stores the contents of the event number area (EN) in the input data area for that program into the event number area of the output data area for that program (step 5503).

In case the application program is run using more than one input data, event number areas of the output data area equal in number to the number of input data are reserved, and the event numbers of all input data are stored in the event number areas in the output data area.

After that, application programs which have become executable are run sequentially (step 5504).

The initiated application program goes on processing using data in the self input data area and stores the result in the corresponding output data area.

Upon completion of execution of application programs which have been run through the foregoing procedures, the processing unit 5107 checks whether output data is stored in the output data area (step 5521 in FIG. 25(b)), and, if the output data is found stored, sends it to the test unit 5105 (step 5522).

Figure 26:
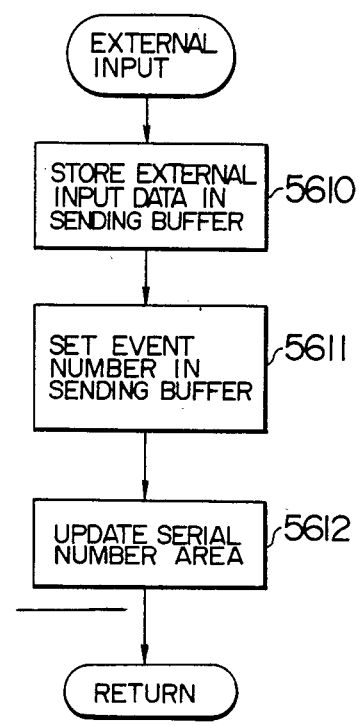

FIG. 26 shows the operation of the external input control unit 5111. At the occurrence of external input, the external input control unit 5111 checks on the external input FC table 5112 the function code of that input data, and sets in the sending buffer 5104 the function code determined from the input data and the external input FC table 5112 (step 5610).

Subsequently, the external input control unit 5111 sets the contents of the self processor number storage area 5113 and the contents of the serial number area 5114 in the event number area in the sending buffer 5104 (step 5611), and thereafter increments the contents of the serial number area by one.

The following describes with reference to FIG. 27 the operation of the test unit 5105 following the execution of the application program. On receiving the output result of the application program from the processing unit 5107, the test unit 5105 checks the test flag in the module attribute table, 5106 to know whether the application program is in the test mode, and, if the program is not in the test mode, stores the data fetched from the processing unit into the sending buffer 5104 (steps 5701, 5702, in FIG. 27(a)). If the program is found to be in the test mode, the test unit 5105 creates test data having, as a data field, data fetched from the processing unit 5107 (step 5703) and stores it in the sending buffer 5104 (step 5704). Data in the sending buffer is formed into the transmission format by the transmission control unit 5101, and sent over the transmission line 301.

FIG. 27(b) shows the format of test data created in step 5703. The function code area 5750 is to set the function code $FC_T$ indicative of test data, and the event number area 5751 is to set the contents of the self processor number storage area 5113 and the contents of the serial number area 5114.

After setting the event number, the test unit 5105 increments the contents of the serial number area by one. The data field 5752 is to set the data content fetched from the processing unit 5107, i.e., the application program output function code 5721, data field 7523 and event number 7522.

Through the foregoing operation of the processing unit 5107 and test unit 5105, it becomes possible to test-run a newly developed application program using on-line data without affecting the system on-line operation by loading the application program in test mode in a processor and setting the test flag in the module attribute table. Output data yielded by the test-run program is reformed into test data (function code $FC_T$) by the test unit 5105 and sent out over the transmission line 301, allowing any processor to fetch the test data for the analysis of the test-run result.

Figure 28A:
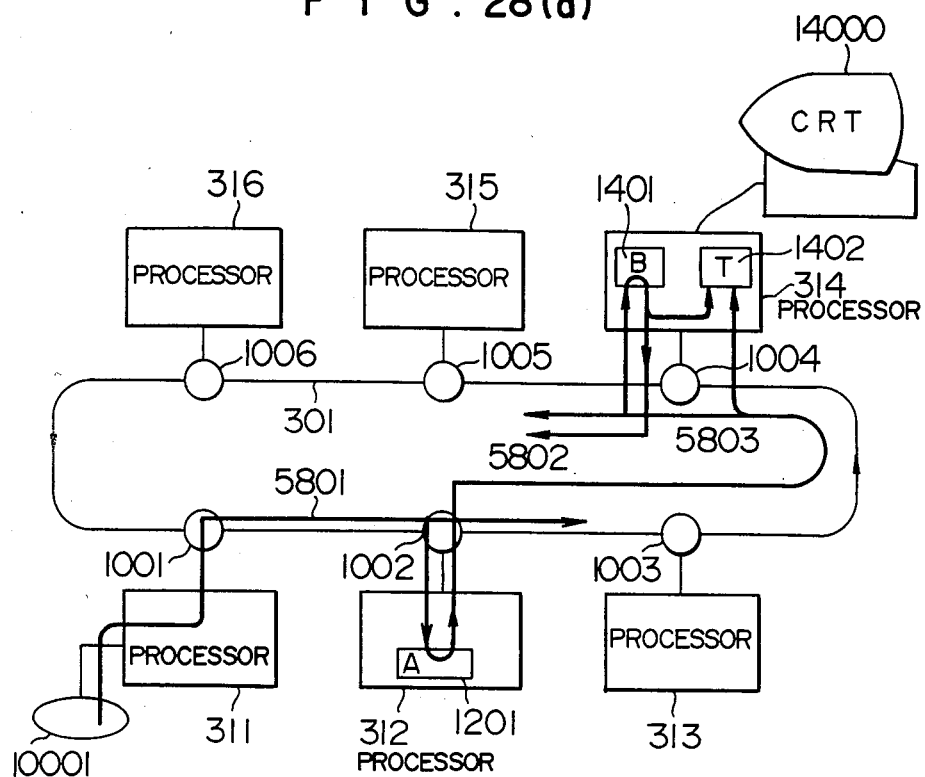

The following describes the test data collecting process with reference to FIGS. 28 and 29. FIG. 28(a) shows the overall system arrangement and the data flow among application programs. In the following example of operation, a program B 1401 which uses the output result of an on-line application program A 1201 of a processor 12 is loaded in the test mode in a processor 14 so that it is tested using on-line data.

Figure 28B:
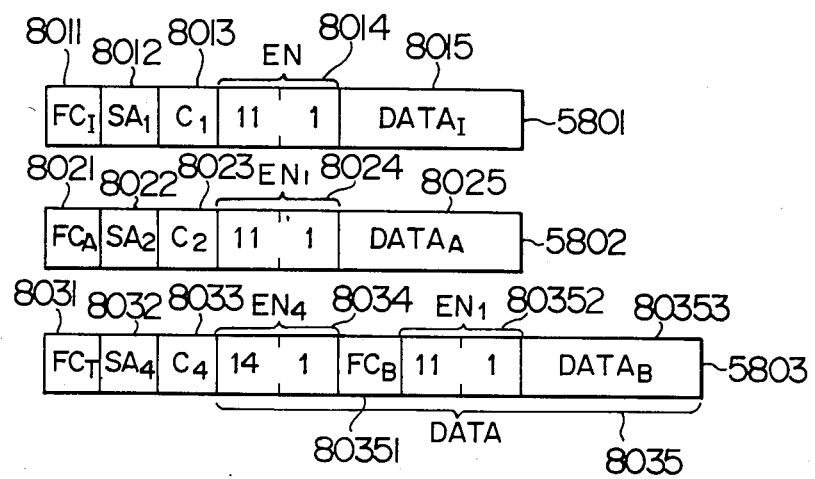

Input data from an external input device 10001 is received by the external input control unit 5111 in the processing unit 311, and data 5801 including a function code ($FC_I$) 8011 (FIG. 28(b)), event number 8014 consisting of a processor number 11 and data generation serial number 1, and external input data content (DATA I) 8015 is generated through the process shown in FIG. 26. The data is sent out via the NCP 1001 over the transmission line 301.

The data format 5801 shown in FIG. 28(b) includes an address (SA1) 8012 of the NCP 1001 and a serial number (C1) 8013 used for transmission. The processor 312 fetches data 5801 via the NCP 1002, and its processing unit 5107 runs the application program A 1201 as shown in FIG. 25(a). The application program A performs the process using DATA I 8015 in the data 5801 and stores process result data DATA A and its function code $FC_A$ in the output data area in the input/output data storage area 5109. The process result is sent via the processing unit 5107, transmission control unit 5101 and NCP 1002 onto the transmission line 301 by being formatted as shown in FIG. 28(b). The contents of the event number of the data 5801 is set in the event number area 8024 by the processing unit.

Besides the test-mode program B 1401 run by the data 5802, a program T 1402 for collecting the test-run result is loaded in the processor 314. FIG. 29(a) shows the structure of the data collecting program T. The program T consists of a program T1 14021 which is run by data 5802 of the program B with the function code $FC_A$, a program T2 14022 which is run by test data with the function code $FC_T$, and a data storage area 14023. The data storage area 14023 is made up of an area 140231 for storing input data for the program B and an area 140232 for storing output data. These areas have a predetermined number of data buffers, which operate to replace older contents thereof with new inputs on a first-in-first-erasure basis.

The program B in the processor 314 is run by the output data 5802 of the program A and yields the process result data DATA B and its function code $FC_B$, as shown in FIG. 28(a). Since the program B is in the test mode, the test unit 5105 in the processor 314 fetches the output data and reforms it into another test data 5803.

Figure 29B:
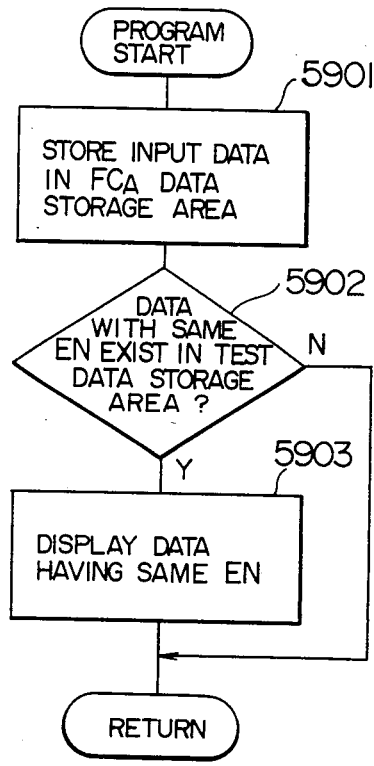

The program T1 14021 in the processor 314 is also run by the same data 5802 (see FIG. 28(a)). FIG. 29(b) shows the process of the program T1. The program T1 stores the function code $FC_A$ 8021, event number $EN_I$ 8024 and data itself DATA A 8025 of the input data 5802 into the FC$_A$ data storage area 140231 (step 901).

Subsequently, the program T1 checks whether data having the same event number as of the input data 5802 is already stored in the test data storage area 140232 (step 5902), and, if it is found stored, displays the input data and the data in the test data storage area having the same event number on the CRT console 14000 as test-run result information (step 5903).

Figure 29C:
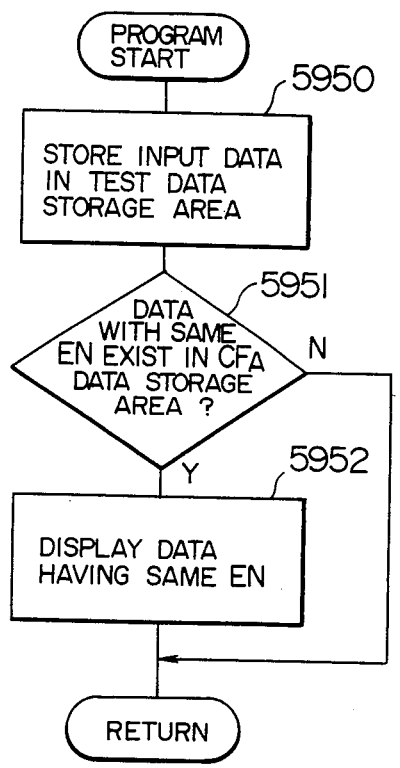

The program T2 14022 (FIG. 29(a)) is run by test data 5803 (see FIG. 28(b)). FIG. 29(c) shows the process of the program T2. The program T2 stores input data 5803 and the function code FC$_B$ 80351, event number 80352 and data itself DATA B 80353 in the data field 8035 into the test data storage area 140232 (FIG. 29(a)) (step 5950).

Subsequently, the program T2 checks whether data having the same event number as that in the data field 8035 of the input data 5803 is already stored in the FC$_A$ data storage area 140231 (step 5951), and, if it is found stored, displays data in the FC$_A$ data storage area and test data storage area having the same event number on the CRT console 14000 as the test-run result (step 5952).

As described above, the fourth embodiment enables a newly developed program to be test-run using on-line data by being loaded in the test mode in an arbitrary processor without affecting the system on-line operation, and enables an arbitrary processor to collect input data for the test-run program and its output result.

Although the above fourth embodiment only deals with the case of test-running a program using on-line data, it is further possible to cause the processor storing a test-run program to proceed automatically to the on-line operation upon completion of the test using on-line data through the provision of an area for storing the normal output pattern of the application program and an output abnormality detection flag within the module attribute table 5106 (FIG. 23) and through the provision of a function which resets the module attribute flag if the output for input data at a certain interval or certain number of inputs after loading of the test-mode program in the test unit 5105 (FIG. 23) is determined to be normal on a comparison basis with the stored normal output pattern.

FIG. 30 shows as an example the operation of the test unit of the case of implementing the test for a certain number (No) of input data. In this example, the program is regarded as normal when the output of the program execution matches the normal output pattern. The processing steps 1701–1704 are identical to the steps 5701–5704 shown in FIG. 27. After test data has been stored in the sending buffer (step 1704), the test unit checks whether output data produced by the program execution matches the output pattern in the module attribute table (step 1705), and, if matching does not result, sets the output abnormality detection flag in the module attribute table (step 1706). After that, the test unit increments the input data counter for the test-run program by one (step 1707).

Subsequently, the test unit compares the counter contents with a predetermined value N2 (step 1708) and checks the abnormality detection flag if the count is above No (step 1709), and, if the flag indicates no abnormality, resets the test flag in the module attribute table (step 1710).

The foregoing process allows a program loaded in a processor to be tested automatically in the on-line environment and to proceed to the on-line operation only when it is certified normal, instead of putting the program into operation without condition.

Although in the above fourth embodiment a test program and data collecting program are set in the processor 14, these programs may be set in an arbitrary processor or in arbitrary processors separately for carrying out the test.

Although the common transmission path of the above fourth embodiment is a unidirectional loop transmission line, any other data transmission medium may of course be used for carrying out the present invention.

As described above, the present invention enables a computer system, which processes a task consisting of a series of processings using a plurality of processors connected in a network distributively, to test a newly developed application program in the on-line environment using an arbitrary processor and also to collect the result of the test, whereby the efficiency of program testing is improved. Moreover, the inventive test method makes possible the on-line operation of an application program only after it has been proved normal or satisfactory by the prior test, whereby the system reliability is enhanced.

We claim:

1. A method for testing a program in a distributed processing system including a plurality of processors connected through a network, each of said processors operating independently form each other, said method comprising the steps of:
   determining whether or not said program in said distributed processing system is to be test-run by a particular one of said plurality of processors;
   acquiring test information corresponding to said program when said program is determined to be test-run by said particular one of said plurality of processors; and
   executing said test-run of said program on the basis of said test information;
   wherein said determining, acquiring and executing steps are performed during on-line operation of said distributed processing system.

2. A method of testing a program in a distributed processing system including a plurality of processors connected through a network, each of said processors having a memory for storing said program when distributed to each of said plurality of processors, said method, comprising the steps of:
   selecting at least one of said processors to operate as a tester for said program;
   determining whether or not said program is to be test-run;
   receiving test information corresponding to said program to be test-run; and
   executing said test-run of said program on the basis of said test information;
   wherein said selecting, determining, receiving and executing steps are performed during on-line operation of said distributed processing system.

3. A method according to claim 1, further comprising the steps of: sending a result of said test-run of said program into said network and receiving the result of the test by said other processor for detecting abnormality of said program.

4. A method according to claim 1, wherein each of said processors suppresses an input or output of data to be processed for an associated input/output device without precluding operation of said input/output device.

5. A method according to claim 1, wherein said test information comprises information indicative of a test-run and test data.

6. A method according to claim 5, wherein said information indicative of said test-run is appended to transmission data.

7. A method according to claim 1, wherein said test information is included in said program.

8. A method according to claim 1, wherein said test information is stored in said plurality of processors.

9. A method for testing a program in a distributed processing system including a plurality of processors connected through a network, each of said processors having a first memory for storing a program under test, a second memory for storing a test flag for said program and test means for implementing a test, said method comprising the steps of:
 transmitting data including a test flag from an arbitrary one of said plurality of processors working as a tester into said network;
 discriminating first test data and other data based on said test flag;
 producing program-running data from said data in said network if said data in said network is identified to be test data;
 executing said program using said program-running data;
 forming execution result data into second test data; and
 transmitting said second test data back into said network;
 wherein all of said method steps are provided in any of said plurality of processors during on-line operation of said distributed processing system.

10. A method according to claim 9, wherein said first test data identified by each of said processors includes a test input value and a normal output value.

11. A method according to claim 9, wherein said test means executes said program using fetched first test data and determines normality or abnormality of said program based on a comparison of output data as a result of execution with said normal output value in said first test data.

12. A method according to claim 1, further comprising the steps of:
 determining whether or not an application program loaded in said processor is in a test mode;
 producing data of a test-run result by fetching data as a result of execution of said application program; and
 transmitting said produced data out into said network when said application program is determined to be in said test mode.

13. A method according to claim 12, further comprising the steps of:
 collecting input data for said program in said test mode and test result data corresponding to said input data, and
 displaying said input data and said test result data.

14. A method according to claim 12, wherein each of said processors has a predetermined output pattern in correspondence to said program in said test mode, said method further comprising the steps of:
 comparing said test result data with said output pattern; and
 releasing said processor from said test mode in response to a predetermined result of the comparison.

15. A test system for testing a program in a distributed processing system including a plurality of processors connected through a network, each of said processors operating independently from each other and at least one of said processors working as a tester, each of said processors comprising:
 means for determining whether or not a program in said system is to be test-run during on-line operation of said system;
 means for acquiring test information corresponding to said program when said program is to be test-run; and
 means for executing the test-run of said program on the basis of said test information.

16. A system according to claim 15, wherein each of said processors further comprises:
 means for transmitting a result of execution of said program into said network in response to the execution of the test-run of said program caused by test information received from another processor; and
 wherein said tester processor includes means for receiving said result and detecting an abnormality of said program.

17. A method for testing a program in a data processing system in which a plurality of programs are stored, said method comprising the steps of:
 preparing a table including test flags respectively corresponding to said plurality of programs, said test flags indicating whether or not the corresponding program is to be tested;
 determining, based on said test flags contained in said table, whether each of said programs is in a test mode or an on-line mode; and
 executing said program based on a result of said determining step.

* * * * *